United States Patent Office 2,815,232
Patented Dec. 3, 1957

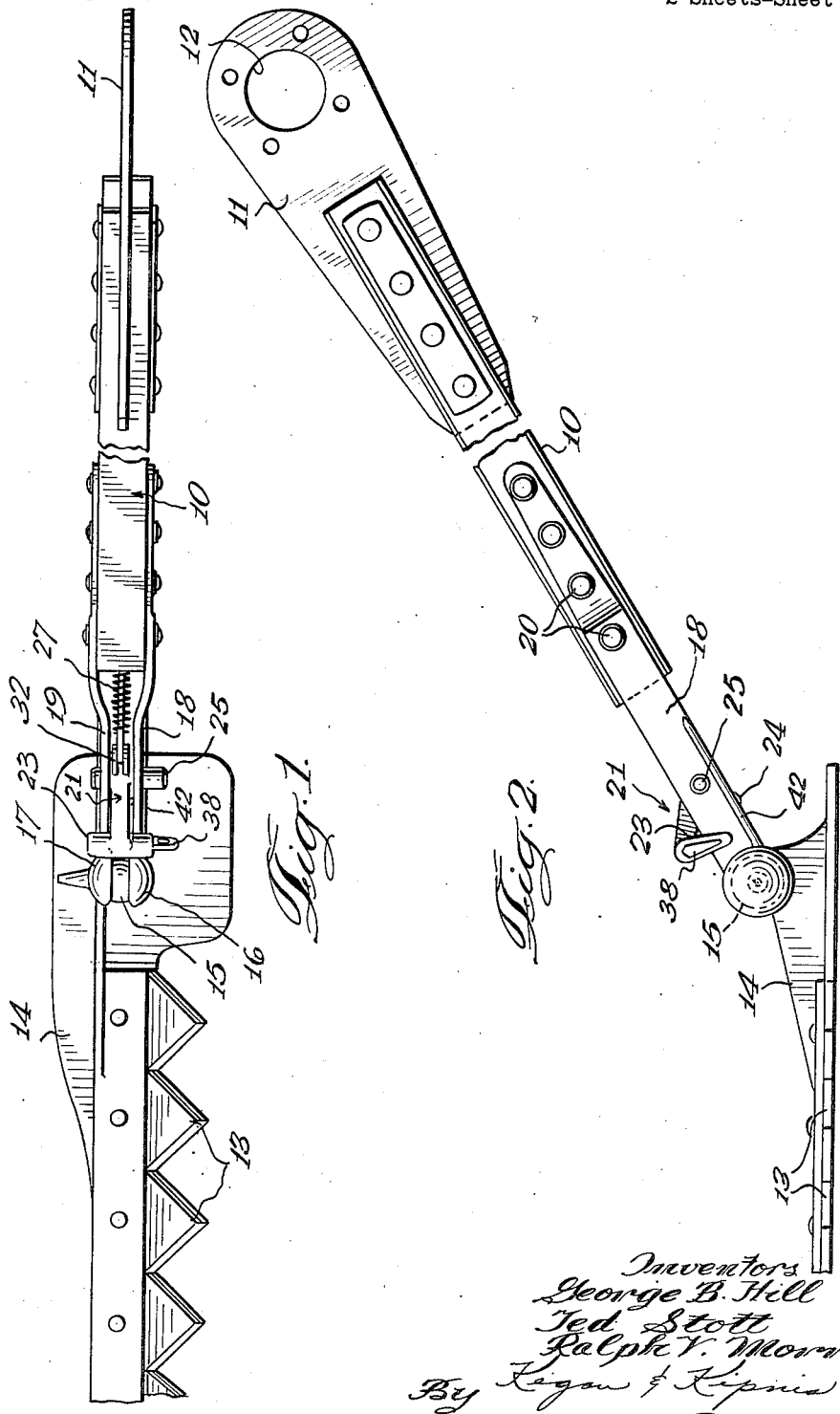

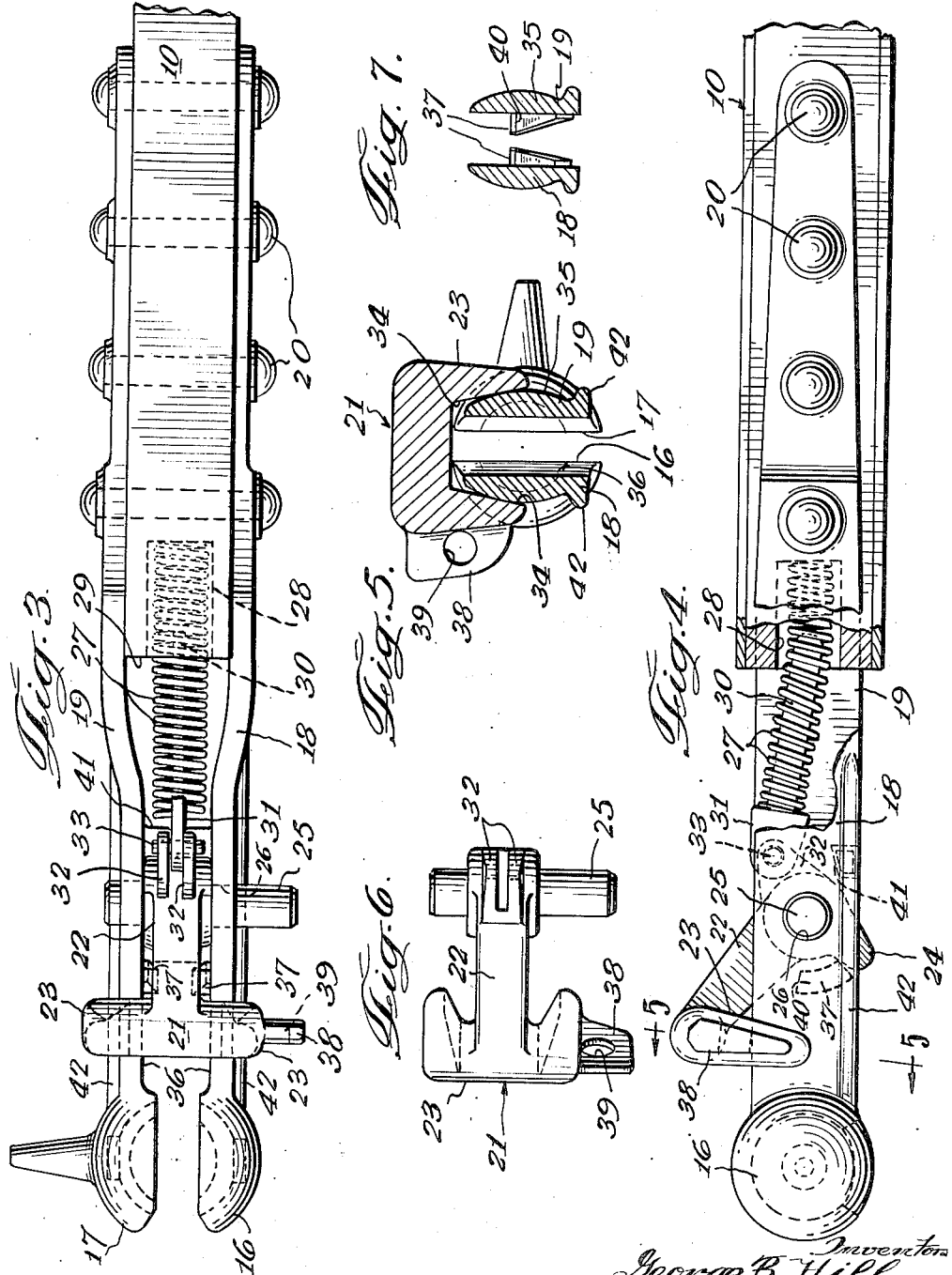

2,815,232

CONNECTOR LATCH DEVICE

George B. Hill and Ted Stott, Celina, Ohio, and Ralph V. Morr, Norristown, Pa., assignors to Avco Manufacturing Corporation, Cincinnati, Ohio, a corporation of Delaware Application August 24, 1953, Serial No. 375,965

2 Claims. (Cl. 287—89)

This invention relates to a connector latch device for universal joint members, as used for instance between the reciprocating knife and the grassward end of a grass mower pitman or the like.

Connectors of this type must be capable of normally holding the universal joint together with suitable pressure for smooth operation. Since the surfaces of the universal joint are exposed to considerable wear and tear, an automatic follow-up or compensating mechanism is required to avoid looseness and consequent noisy and destructive operation. It is an object of the present improvement to obtain such compensation in balanced and generally efficient manner.

It is also necessary in devices of this kind to provide for quick assembly and disassembly of the pitman and knife, or equivalent parts, for purposes of interchange, repair and the like. It is an object of the new latch to allow such connecting and disconnecting operations in a manner whereby relatively high stresses, imposed in either of these operations are avoided in improved manner.

Parts of the present kind, when used for agricultural applications such as grass mowing must be extremely sturdy, so that they operate even in the presence of dust, moisture, grass accumulations, strings and the like; they must allow operation without special tools and they should be free from parts which can easily be lost, such as cotter pins, small unprotected screws and the like. It is an object of the new latch to simplify the pitman in these respects.

Thus, it is a general object of the invention to combine accuracy of automatic pressure follow-up with simplicity of connecting and disconnecting and with sturdiness as well as economy in the arrangement and disposition of parts.

These objects are attained by novel latch means and cooperating parts, incorporated in the basically well known pitman strap assembly connecting the jaw members of the universal joint with the pitman rod. Each strap according to the new design is formed, and preferably forged, as a simple, slender, elongated member, with substantially axially located, inner and outer surface projections thereon. These surface projections cooperate with a new latch fork and key member. Normally, this new member, by a simple fork part engaging the outside of the strap, applies suitably controlled pressure to keep the joint connected. When required, the same member, by an interior key portion engaging the inner surfaces of the straps, disconnects the joint. Both the inner and outer surfaces mentioned are located remotely of the points of attachment between the pitman rod and straps, and substantially axially of the straps. Required bearing pins and small parts are effectively protected from loss.

The exact details and features will be understood from the description which follows, in combination with the drawing wherein a preferred form of the present device is illustrated. Of course a number of changes can be applied, within the scope of the claims appended at the end of this specification. In the drawing:

Figure 1 is a fragmentary plan view of a pitman and grass mower knife secured together by a preferred form of connector according to this invention.

Figure 2 is an elevation of the parts shown in Figure 1.

Figure 3 is a view generally similar to Figure 1 but showing the connector on a larger scale.

Figure 4 is a view generally similar to Figure 2 on the scale of Figure 3.

Figure 5 is a section through Figure 4 along the line 5—5.

Figure 6 is a plan view of the latch, alone, in one of its operative positions.

Figure 7 is a sectional view showing the strap construction in the present invention.

Referring first to Figures 1 and 2: The pitman rod 10 can have a conventional end plate 11 at its stubbleward end, suitably formed at 12 to provide a bearing for the wrist pin of the flywheel or other driving element. At the opposite or grassward end, the rod 10 is connected with a conventional grass mower knife 13 or the like by the usual knife head 14. A ball 15 secured to this head provides one of the parts of the connectable and disconnectable and automatically adjustable universal joint. The joint also has a pair of jaws 16 and 17, having the usual spherically formed surfaces on their inside, facing one another and engaging the ball 15. The jaws are integrally formed in or at the grassward end of the connector straps or side arms 18 and 19. The opposite end parts of the straps are secured to the adjacent end of the rod 10, as by rivets 20 located substantially on the longitudinal axes of the straps.

The new latch fork and key member 21 (Figures 3 to 6) has a short shank 22, with a fork 23 at one end and a key 24 at the other; these parts being rigidly secured together as for instance by integral forging. The fork 23 is wide enough to embrace and compress the straps 18 and 19, while the shank 22 and key 24 are narrow and inserted between the two straps, which are spaced from one another in the usual manner. The fork and key member 21 has an integral pivot pin 25, whereby it is journaled for swinging motion in a vertical plane; each strap 18, 19 having a suitable bearing aperture 26 for the reception of the pin 25, approximately midway between the jaws 16, 17 and the adjacent end of the rod 10. Preferably the shank 22, fork 23 and key 24 all extend from the pin 25 toward the jaws 16, 17, in order that their respective pressures may be applied remotely of the rivets 20 and with fine and accurate control.

Inwardly wedging or joint connecting pressure is applied to the latch device 21 by means of a simple compression spring 27, one end of which is inserted in a suitable socket 28 formed in the center of the grassward end 29 of the rod 10. The other end of the spring 27 has a stem or prong 30 inserted therein which is shorter than the spring itself and carries, at the free end, a connector clip or clevis 31, most simply formed by a small plate disposed in a vertical plane. A pair of similarly disposed jaws or plates 32 are secured to the latch device 21 adjacent the pivot pin 25 and are connected with the clip 31 by a suitable pin 33. Thus, the pressure of the follow-up spring 27 is transmitted to the latch device 21, the spring being free to bend slightly in a vertical plane as it expands and contracts.

The fork 23 has a pair of inner strap-engaging surfaces 34 which diverge outwardly and, as shown, downwardly in order to apply progressive joint-connecting pressure to outwardly curved outside surfaces 35 of the straps 18, 19 when the fork is brought into closer downward engagement with the straps. The fork 23 is so oriented on the shank 22 as to move transversely of the straps and into a closer engagement therewith when and as the spring 27 expands, rotating the jaws 32 about the pivot 25. For this purpose the connector pin 33 is disposed at or above the axes of the straps in all normal positions of the latch 21, so that positive joint-connecting pressure is normally applied by the spring 27.

The pivot members 32 extend from the pivot 25 toward the rod 10, and slightly upwards. Accordingly, as the pivot 33 is raised above the axes of the straps, upon expansion of the spring 27, the pressure of the spring gains greater moment about the pivot 25 and greater effect against the load applied at 23. This arrangement has been found most useful and efficient, since it tends to compensate for the natural decrease of the spring force, upon expansion of the spring; such expansion being required by progressive wearing off of ball joint surfaces.

Thus the pivot 33 moves progressively upwards. However, it is so arranged relative to the straps 18, 19 that it remains at least partly between these straps, even in its highest operative position. Thus the connector pin 33 is safely protected from being lost.

The key portion 24 of the latch 21 is normally out of contact with the adjacent, interior side surfaces 36 of the straps 18, 19. However, each strap has an inwardly projecting boss or key-engaging element 37 or so-called cam, integrally formed on the surface 36, the inward projection of which increases upwardly. Each boss 37 desirably forms a short arc about the pivot 25. The key 24 has side surfaces more widely spaced from one another than the inner and upper end portions of the projections 37, so that progressive wedging engagement between these surfaces causes the straps 18, 19 and jaws 16, 17 to spread apart and disconnect the ball 15. For this purpose the key 24 is located below the axis of the straps and so oriented relative to the fork 23 as to remain out of contact with the bosses 37 in all normal operating positions of the latch. An ear 38, having a hole 39 for receiving a suitable pry-bar engaging the extended end of pivot 25, may be secured to the upper and outer end of the shank 22, whereby the latch 21 can be raised above its uppermost normal position, against the compression of the spring 27 and wedge action of the key 24, thereby causing progressive engagement between the key 24 and projections 37.

Preferably, as shown, the uppermost and innermost end portions 40 of the projections 37 are disposed adjacent the axes of the straps, in order that the most severe stresses, imposed upon the straps in the disconnecting movement, may be absorbed with the least possible flexing strain and corresponding gradual loss of accuracy in normal follow-up. In this manner the straps 18, 19 can be formed as very light and slender parts, weighing considerably less than those used in the past and still providing the requisite strength and durability. The resulting lightness of the pitman-knife joint makes the operation smooth and relatively silent and reduces the overall cost.

In normal operation, wear and tear of the spherical joint 15, 16, 17 is unavoidable. It is taken up, without any substantial variation of effective connecting pressure, by the automatic upward shifting of the spring connector 33 and consequent enlargement of the spring moment arm; the narrow connectors and key 24 of the shank 22 being allowed to move freely in the space between the straps 18, 19.

The ball 15 can be disconnected and reconnected easily, quickly, and effectively by obvious operations on the connector ear 38, and release thereof. Loss of engagement between the key 24 and projection 37 in the joint-disconnecting position is avoided by a stop 41, adapted to engage the underside of a plate 32.

The straps 18, 19 can be strengthened by ribs 42, and various other additions or modifications can be applied.

What is claimed is:

1. In a joint of the pitman rod and ball socket type: a pair of socket holder straps having connector means at one end to secure them to and space them apart by the rod, said straps being disposed opposite one another and elongated along the axes from the connector means to the sockets, and provided with a first pair of cam surfaces located opposite each other, one on each of the inner surfaces of said straps and upwardly and inwardly converging towards each other, said straps further being provided with a second pair of cam surfaces located one on each of the outer surfaces of said straps and downwardly and outwardly diverging from each other; a latch pivoted to said straps at a fixed journal bearing point between the rod and the sockets, said latch having thereon a key portion engageable with said first pair of cam surfaces to force the sockets apart and disconnect the joint as said latch is pivoted in a first sense, and a fork portion engageable with said second pair of cam surfaces to maintain the joint secure as said latch is pivoted in a second sense; and spring means anchored against the rod and acting on the latch to move the same in said second sense so as to apply wear-compensating pressure to said second pair of cam surfaces.

2. In a connector of the type described, a rod; a pair of straps secured to and spaced apart by the rod and extending beyond the same opposite one another; a first pair of wedge surfaces, one on each of said straps, and upwardly and inwardly converging towards each other, the innermost portions of said wedge surfaces being disposed substantially adjacent the axes of said straps; a latch fork and key member, said member having a pivot portion rotatably mounted on said straps between the free ends thereof and said rod at a fixed pivot point, a key portion extending from said pivot portion and engageable with said wedge surfaces on said straps to wedge said straps apart as said member is pivoted in a first sense, a bearing portion extending from said pivot portion opposite said key portion, a shank portion between said key and bearing portions, and a fork straddling the straps at the free end of the shank portion, said fork having a pair of surfaces, downwardly and outwardly diverging from each other, and engageable with the outer surfaces of said strap as said member is pivoted in a second sense; and a compression spring bearing against the rod and tending to raise the bearing portion of said member, whereby substantially uniform spring pressure is applied to the straps, as said fork surfaces engage the straps, regardless of gradual expansion of the spring.

References Cited in the file of this patent

UNITED STATES PATENTS 1,446,111     Benjamin et al. _____ Feb. 20, 1923

FOREIGN PATENTS 68,540     Sweden _____ Feb. 4, 1927